United States Patent
Weng et al.

(10) Patent No.: US 10,232,691 B1
(45) Date of Patent: Mar. 19, 2019

(54) LATCHING SYSTEM FOR SECURING TONNEAU COVER

(71) Applicant: Ningbo Diroan Auto Accessories Co., Ltd., Cixi, Zhejiang (CN)

(72) Inventors: Rongjie Weng, Zhejiang (CN); Fangliang Weng, Zhejiang (CN)

(73) Assignee: NINGBO DIROAN AUTO ACCESSORIES CO., LTD., Cixi (CN)

( * ) Notice: Subject to any disclaimer, the term of this patent is extended or adjusted under 35 U.S.C. 154(b) by 0 days.

(21) Appl. No.: 16/107,252

(22) Filed: Aug. 21, 2018

(30) Foreign Application Priority Data

Aug. 15, 2018 (CN) .................. 2018 2 1313019 U
Aug. 15, 2018 (CN) .................. 2018 2 1320300 U

(51) Int. Cl.
*B60P 7/02* (2006.01)
*B60J 7/19* (2006.01)
*B60J 7/16* (2006.01)

(52) U.S. Cl.
CPC .............. *B60J 7/198* (2013.01); *B60J 7/1607* (2013.01)

(58) Field of Classification Search
CPC .......... B65H 2511/214; B65H 2220/02; B65H 2220/11; B65G 2201/0229; A47L 13/24; B60R 9/06; B60R 9/00; B62D 33/04; B60P 7/0815; B60P 7/15
USPC .................................................... 296/100.07
See application file for complete search history.

(56) References Cited

U.S. PATENT DOCUMENTS

| | | | |
|---|---|---|---|
| 3,420,570 A | 1/1969 | Kunz | |
| 3,704,039 A | 11/1972 | Dean | |
| 4,741,570 A | 5/1988 | Lovaas | |
| 6,076,881 A * | 6/2000 | Tucker | B60J 7/141 296/100.07 |
| 6,663,160 B2 | 12/2003 | Yarbrough et al. | |
| 6,808,220 B2 * | 10/2004 | Wheatley | B60J 7/102 296/100.15 |
| 7,188,888 B2 | 3/2007 | Wheatley et al. | |

(Continued)

FOREIGN PATENT DOCUMENTS

WO WO2004087030 A1 10/2004
WO WO2017070786 A1 5/2017

OTHER PUBLICATIONS

ProZ ProRoll Tonneau Cover with Truck Bed Light, 2000-2018 AutoAnything, Inc.

(Continued)

*Primary Examiner* — Kiran B Patel
(74) *Attorney, Agent, or Firm* — Brinks Gilson & Lione

(57) ABSTRACT

The disclosure is directed to a latching/locking system for securing tonneau cover to a vehicle. The system includes a mounting bar, a hanging rod, a locking block and a handle and further includes a cargo area cover frame body. The cargo area cover frame body includes an outer frame bar along an outer edge and an inner support bar inside the cargo area cover frame body. The mounting bar comprises a built-in section and an inserting block, which is fixed within the outer frame bar. An upper end of the hanging rod is inserted into the mounting bar, a horizontal shaft is disposed at an upper portion of the handle, and a lower end of the hanging rod is disposed into the horizontal shaft and connected to the horizontal shaft through a thread. The locking block is disposed on the hanging rod.

12 Claims, 12 Drawing Sheets

(56) References Cited

U.S. PATENT DOCUMENTS

| | | | |
|---|---|---|---|
| 7,334,830 B2 | 2/2008 | Weldy | |
| 7,628,442 B1* | 12/2009 | Spencer | B60J 7/104 24/455 |
| 7,823,957 B2* | 11/2010 | Williamson | B60J 7/104 292/256 |
| 8,146,982 B2 | 4/2012 | Williamson et al. | |
| 8,256,824 B2 | 9/2012 | Williamson et al. | |
| 8,480,154 B2 | 7/2013 | Yue | |
| 8,814,249 B2 | 8/2014 | Rossi | |
| 9,073,417 B1 | 7/2015 | Smith | |
| 9,120,413 B2* | 9/2015 | Fink | B60J 7/102 |
| 9,333,842 B2* | 5/2016 | Yue | B60J 7/141 |
| 9,469,181 B2 | 10/2016 | Jeffries et al. | |
| 9,487,070 B2 | 11/2016 | Xu | |
| 9,610,831 B2 | 4/2017 | Shi et al. | |
| 9,925,853 B2 | 3/2018 | Aubrey et al. | |
| 2006/0208524 A1* | 9/2006 | Brown | B60J 7/104 296/100.01 |
| 2007/0063529 A1* | 3/2007 | Weldy | B60J 7/08 296/100.07 |
| 2007/0271745 A1* | 11/2007 | Frey | F16B 2/185 24/568 |
| 2010/0270824 A1* | 10/2010 | Yue | B60J 7/198 296/100.07 |
| 2014/0042769 A1* | 2/2014 | Spencer | B60P 7/04 296/100.16 |
| 2017/0066311 A1* | 3/2017 | Facchinello | B60J 7/198 |
| 2017/0217294 A1* | 8/2017 | Lutzka | B60J 7/141 |
| 2017/0361692 A1 | 12/2017 | Corder et al. | |

OTHER PUBLICATIONS

Tipper Latch, TL382.
Tonno Pro Lo-Roll—LR-2020, Truck Outfitters Plus.

* cited by examiner

US 10,232,691 B1

LATCHING SYSTEM FOR SECURING TONNEAU COVER

RELATED APPLICATION

This application claims priority to Chinese Patent Application No. 201821313019.1, filed with the Chinese Patent Office on Aug. 15, 2018 and Chinese Patent Application No. 201821320300.8, filed with the Chinese Patent Office on Aug. 15, 2018, both of which are incorporated by reference in their entireties.

BACKGROUND

1. Technical Field

The present disclosure relates to a cargo area cover for a pickup truck, and in particular to a locking mechanism for a cargo area cover for a pickup truck.

2. Background Information

A pickup truck is a type of vehicle having an engine compartment and a cab of a sedan as well as an open truck cargo area of a truck. For a car such as a pickup truck that has a rear hopper, the rear hopper is typically configured to carry cargo. The rear hopper may not be covered in any manner at the time of delivery of the car, so cargo easily affected by the external environment. Therefore, a number of cargo area covers have emerged in the refitting market of pickup trucks. At the same time, some cargo area covers are provided with a locking mechanism for fast locking or detaching.

A shortcoming of such manner may be that when the mounting bar is subjected to a pressure perpendicular to the cargo area cover. The portions of the mounting bar having the sliding chute and the sliding chute cavity are exposed to the outside, the mounting bar is easily broken when shocked and impacted. In particular, stress concentrates at the joint between the portions of the mounting bar having the sliding chute and the sliding chute cavity and both ends within the cargo area cover into which the mounting bar is inserted, and therefore deformations or breaks tend to happen.

Another shortcoming with existing locking mechanism may be that, when the cargo area cover is locked, the slider can slide back and forth in the sliding chute, thus causing the locking handle to easily slide along the sliding chute and resulting in a low efficiency in locking the cargo area cover through the locking handle.

The present disclosure is directed toward addressing one or more drawbacks, including but not limited to those set forth above.

BRIEF SUMMARY

The present disclosure describes one embodiment of an apparatus for apparatus for latching a cargo area cover to a vehicle. The apparatus includes a mounting bar, a hanging rod, a locking block and a handle. The apparatus further comprises a cargo area cover frame body, the cargo area cover frame body comprising an outer frame bar along an outer edge and an inner support bar inside the cargo area cover frame body, the inner support bar being perpendicular to the outer frame bar. The mounting bar comprises a built-in section and an inserting block, the built-in section being located within the inner support bar, and the inserting block being fixed within the outer frame bar. An upper end of the hanging rod is inserted into the mounting bar through the inner support bar. A horizontal shaft is disposed at an upper portion of the handle, a lower end of the hanging rod being inserted into the horizontal shaft and being connected to the horizontal shaft through a thread. The locking block is sheathed on the hanging rod and being located between the handle and the mounting bar.

The present disclosure also describes another embodiment of a device for latching a cargo area cover to a vehicle. The device includes a locking handle, a mounting bar mounted on an underside of the cargo area cover, a positioning block fixedly embedded in the mounting bar and a connecting rod vertically connected to the locking handle and the positioning block, a plurality of mounting grooves available for embedding the positioning block being made on a top of the mounting bar, spaced apart in a direction of a length of the mounting bar, and a shaft hole available for passing through the connecting rod being made on the mounting bar on a bottom of each mounting groove.

The present disclosure also describes a system for latching/locking a cargo area cover to a vehicle. The system includes either an apparatus or a device as described in previous embodiments.

REFERENCE SIGNS

Figure 1:
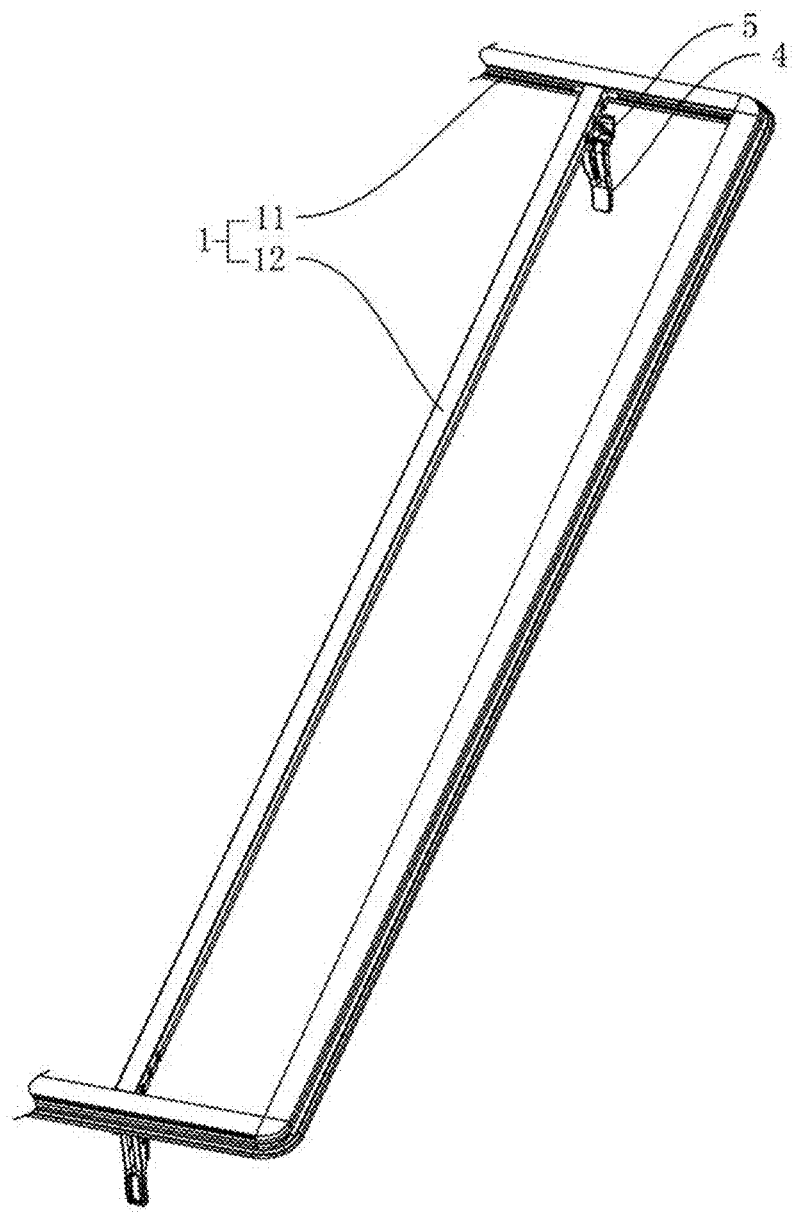
FIG. 1 is a schematic structural diagram of a cargo area cover frame body.

1. Cargo area cover frame body;
11. Outer frame bar;
111. Sliding chute rabbet;
1111. Sliding chute rabbet;
12. Inner support bar;
121. Opening;
122. Exposed opening;
2. Mounting bar;
21. Built-in section;
211. Accommodation groove;
2111. Clamping opening;
2112. Through opening;
2113. Limiting piece;
2114. Rotating groove;
212. Rotating column;

2121. Abutting portion;
2122. Embedding groove;
2123. Through hole;
213. Fixing nut;
214. Upper stop piece;
215. Lighting assembly;
2151. Button;
2152. light bead;
22. Inserting block;
23. Fixing hole;
3. Hanging rod;
4. Handle;
41. Notch;
42. Horizontal shaft;
5. Locking block;
51. Abutting and pressing edge;
6. Cargo area edge;
2-1. Cargo area cover;
2-2. Locking handle;
2-3. Mounting bar;
2-4. Positioning block;
2-5. Connecting rod;
2-6. Cover plate;
2-7. Outer frame bar;
2-8. Inner frame bar;
2-9. Lighting assembly;
2-31. Mounting groove;
2-32. Shaft hole;
2-33. Mounting opening;
2-34. Fixing block;
2-341. First positioning hole;
2-342. Fastener;
2-35. Snapping block;
2-61. Limiting groove;
2-62. Limiting block;
2-71. Second positioning hole; and
2-91. Control panel.

DETAILED DESCRIPTION OF THE DISCLOSURE

The disclosure will now be described in detail hereinafter with reference to the accompanied drawings, which form a part of the present disclosure, and which, by way of illustration, specific examples of embodiments. Please note that the disclosure may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. It is intended, for example, that claimed subject matter includes combinations of exemplary embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context. Similarly, terms, such as "underside" and "top surface" as well as "transversal direction" and "vertical direction" respectively refer to geometric directions in which a locking mechanism is actually mounted when a cargo area cover 1 is horizontally positioned.

As shown in FIGS. 1-9, a locking/latching apparatus or a locking/latching system for a cargo area cover for a pickup truck includes a cargo area cover frame body 1, the cargo area cover frame body 1 being a skeleton of the cargo area cover, its shape depending on actual situations, and here being a rectangular frame body. A pickup truck is used as an example to describe the present disclosure, and the present disclosure is not limited to pickup truck, it may applies to other types of vehicles having a certain area upon which a cover may be disposed.

The cargo area cover frame body 1 includes an outer frame bar 11 along an outer edge and an inner support bar 12 inside the cargo area cover frame body 1. The outer edge bar 11 may be a primary rail or a side rail, and the inner bar 12 may be a secondary rail or a support rail. Here, the number of outer frame bars 11 is four and they form a rectangle, and the number of inner support bars 12 depends on actual requirements for the size of the cargo area cover frame body 1. The number of inner support bars 12 may be 1, 2, 3, 4, 6, 8, or any integer number. In one implementation, each inner support bar 12 is perpendicular to two of the outer frame bars 11.

Figure 2:
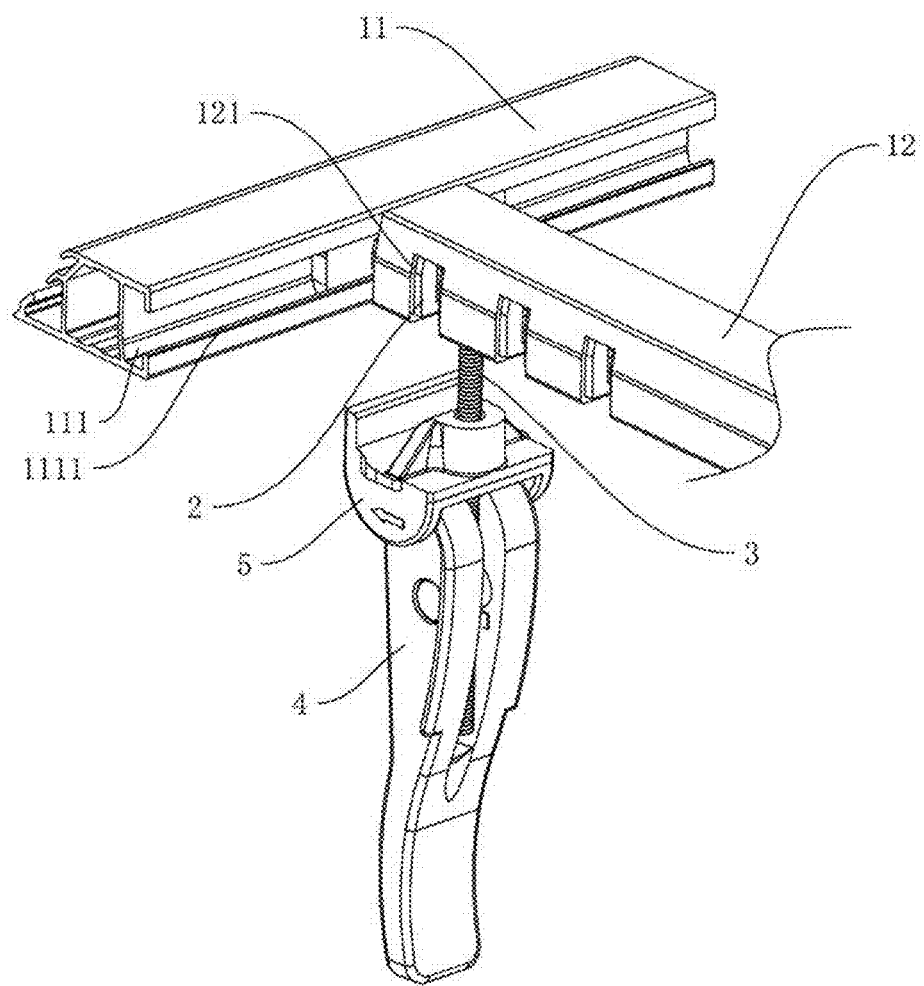
FIG. 2 is a schematic structural diagram of a joint between an outer frame bar and an inner support bar.
Figure 3:
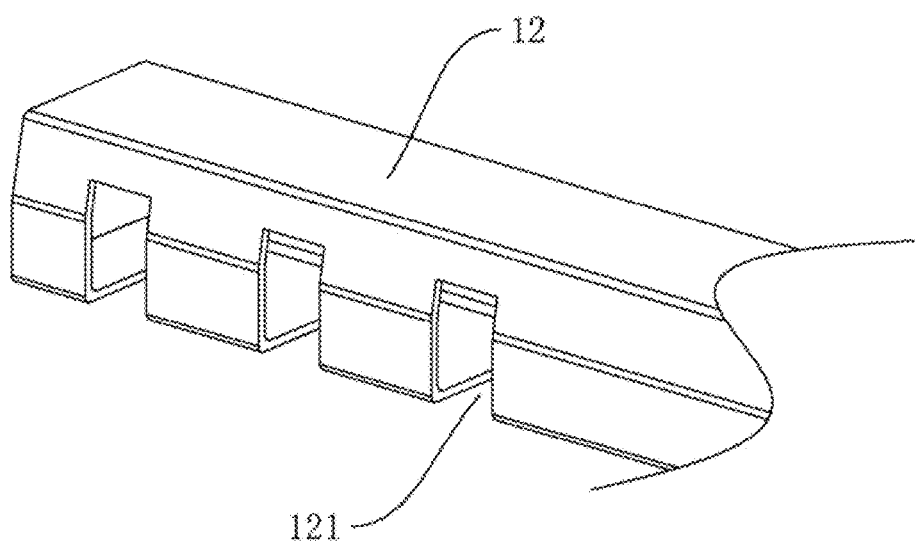
FIG. 3 is a schematic structural diagram of an end of an inner support bar.

One embodiment of a locking/latching apparatus or a locking/latching system is shown in FIG. 2. In this embodiment, the outer frame bar 11 perpendicular to the inner support bar 12 is provided with a sliding chute 111 on one side that faces an inner side of the cargo area cover frame body 1. The sliding chute 111 extends in the direction of the length of the outer frame bar 11, and a sliding chute 111 rabbet having the width less than the height of the sliding chute 111 is made on one side of the outer frame bar 11 that faces the inner side of the cargo area cover frame body 1.

The inner support bar 12 is hollow inside, several openings 121 being provided on both ends thereof. In connection with FIG. 3, the openings 121 are provided on one side and the underside of the inner support bar 12, the openings 121 are distributed in the direction of the length of the inner support bar 12, and a cross section of each opening 121 taken perpendicularly to the direction of the length of the inner support bar 12 is in the shape of an "L". The number of openings 121 depends on actual situations, here the number of openings 121 being three.

As shown in FIG. 2, the locking mechanism further includes an mounting bar 2, one end of which is inserted into the inner support bar 12; a hanging rod 3 which is inserted into the mounting bar 2 through the opening 121; a handle 4 which is mounted on a lower end of the hanging rod 3; and a locking block 5 which is sheathed on a side of the hanging rod 3 that is located above the handle 4.

Figure 4:
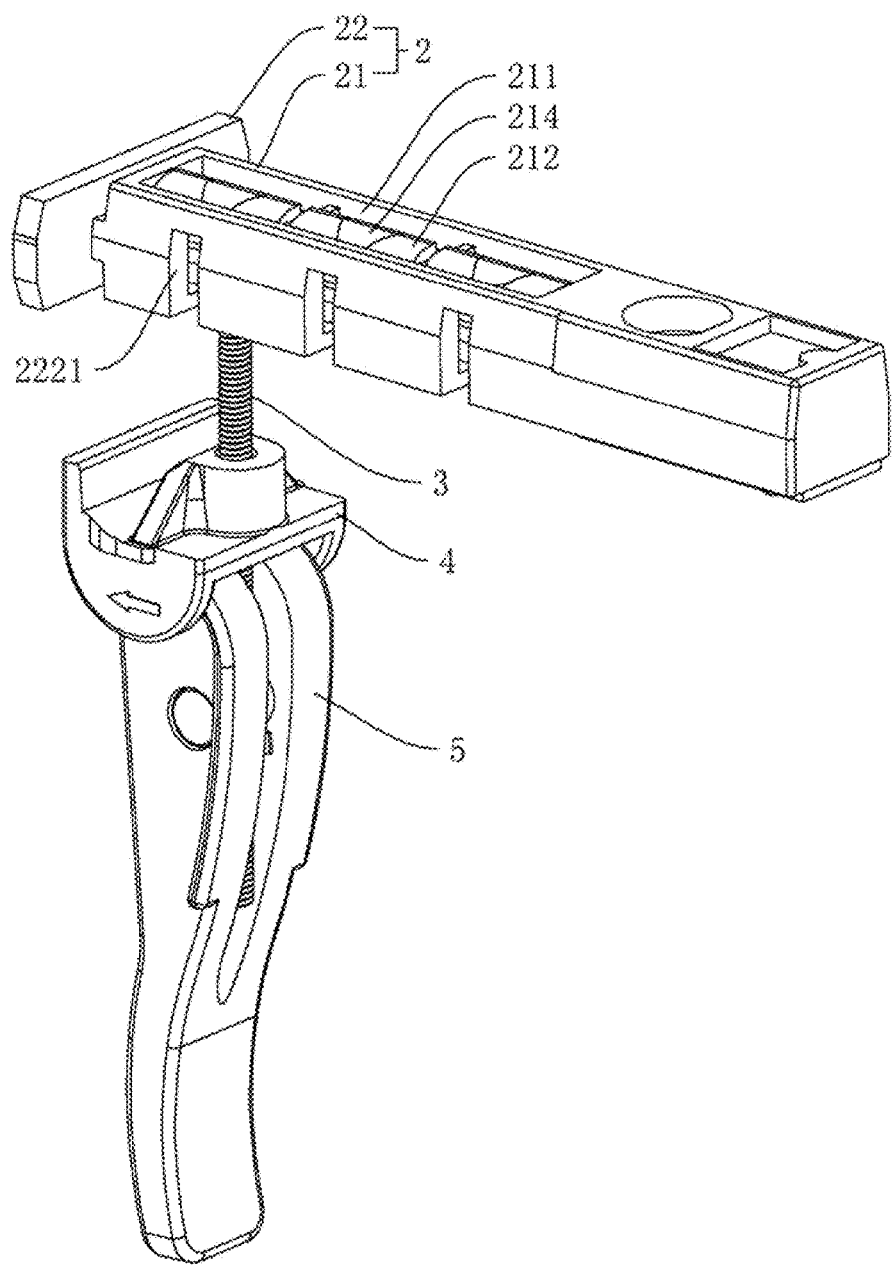
FIG. 4 is a schematic structural diagram I of a mounting bar.

As shown in FIG. 2 and FIG. 4, the mounting bar 2 includes a long narrow built-in section 21 and an inserting block 22 provided on one end of the built-in section 21. The thickness of the built-in section 21 is less than the width of the sliding chute 111; the inserting block 22 may be accommodated within the sliding chute 111, and the height of the inserting block 22 is greater than that of the sliding chute 111 rabbet, such that the inserting block 22 is limited within the sliding chute 111 and can be slid within the sliding chute 111. Several accommodation grooves 211 are provided on an upper surface of the built-in section 21 in the direction of the length thereof, the number of accommodation grooves 211 being equal to the number of openings 121, and here each accommodation groove 211 being rectangular and being open on the top.

Figure 5:
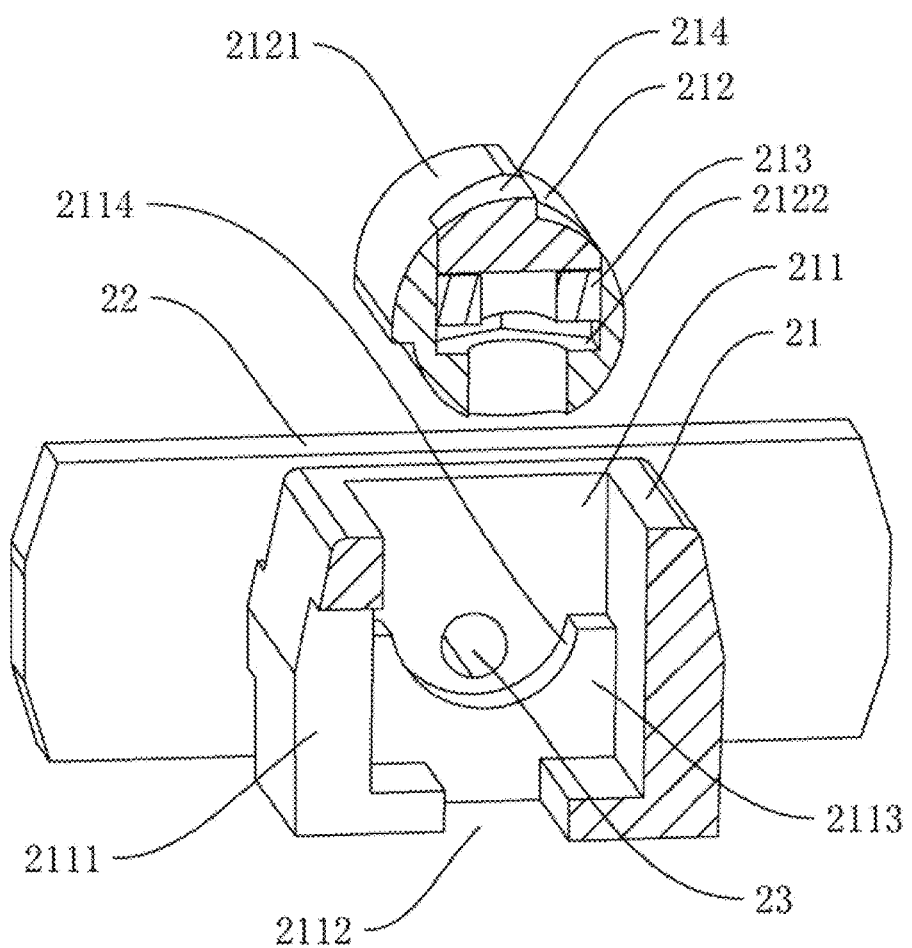
FIG. 5 is a schematic structural diagram II of a mounting bar.

As shown in FIG. 5, for an accommodation groove 211 of the built-in section 21 that is closest to the inserting block 22, a fixing hole 23 passing through the inserting block 22 is made on a side of the accommodation groove that is close to the inserting block 22. The fixing hole 23 is available for a bolt piece to pass through, so as to fix the inserting block 22 to the outer frame bar 11.

A clamping opening 2111 is provided on a side wall of the accommodation groove 211, a through opening 2112 being provided at the bottom of the clamping opening. A lower end of the clamping opening 2111 is in communication with one side of the through opening 2112, the shape of an point of communication between the through opening 2112 and the clamping opening 2111 being similar to the shape of the opening 121. In connection with FIG. 2 and when the built-in section 21 is mounted within the inner support bar 12, the through opening 2112 and the clamping opening 2111 are both located inside an edge of the opening 121.

Figure 6:
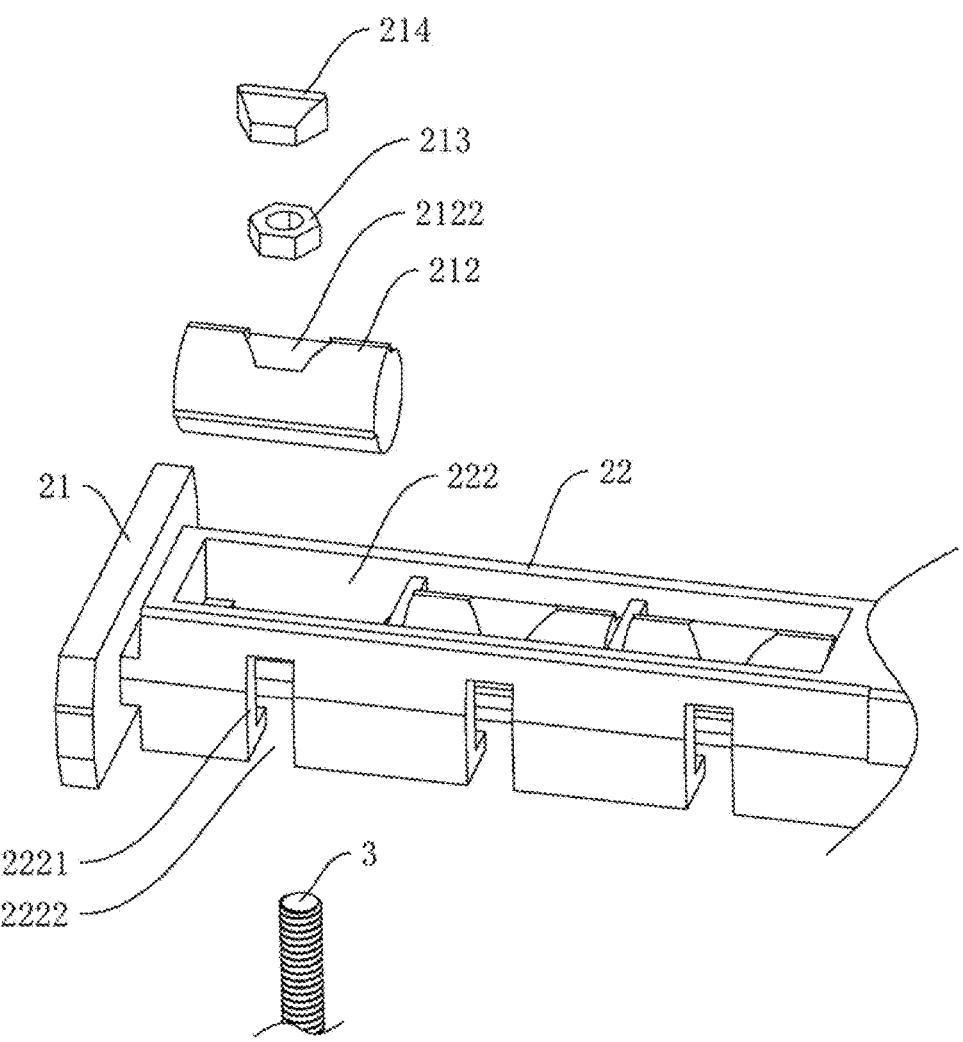
FIG. 6 is an exploded view of a mounting bar.

As shown in FIG. 5 and FIG. 6, a rotating column 212 is provided within each of the accommodation grooves 211. The rotating column 212 is columnar, an abutting portion 2121 being provided on its side edge, the length of the abutting portion 2121 being equal to that of the rotating column 212, and the shape of a cross section of the abutting portion taken perpendicularly to an axis of the rotating column 212 being fan-shaped and circular, with a central angle of 90 degrees. A limiting piece 2113 is provided on both sides of the accommodation groove 211 that are perpendicular to the direction of the length of the built-in section 21, a rotating groove 2114 being provided at an upper end of the limiting piece 2113. The rotating groove 2114 is semicircular, its diameter being equal to the diameter of the rotating column 212 and being less than that of the rotating groove 2114 provide at the upper end of the limiting piece 2113. A side of the rotating column 212 is attached to the rotating groove 2114, while both sides of the abutting portion 2121 may abut against an outer edge of a rabbet of the rotating groove 2114.

An embedding groove 2122 is made on a side of the rotating column 212, the shape of the embedding groove 2122 depending on actual situations, here preferably being in the shape of a regular hexagonal prism. A fixing nut 213 embedded to the embedding groove 2122 is accommodated within the bottom of the embedding groove, and at the same time an upper stop piece 214 is embedded in the accommodation groove 211 within its rabbet. The shape of the upper stop piece 214 resembles a hexagonal prism, its upper surface conforming to the side of the rotating column 212. A through hole 2123 for passing through the hanging rod 3 is further made at the center of the bottom of the embedding groove 2122. When both ends of the abutting portion 2121 abut against the outer edge of the rabbet of the rotating groove 2114, an axis of the through hole 2123 is vertically disposed or horizontally disposed.

Figure 7:
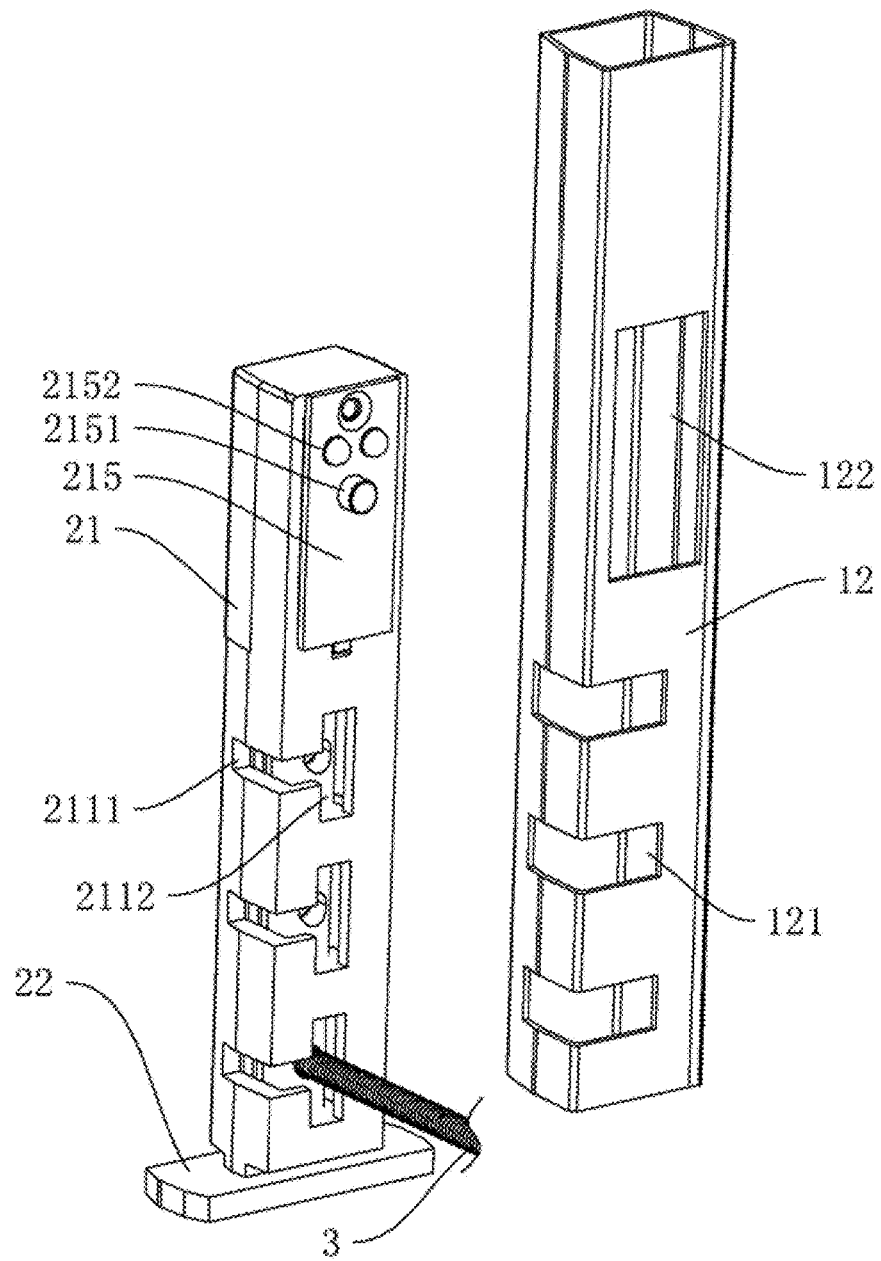
FIG. 7 is a schematic structural diagram III of a mounting bar.

As shown in FIG. 7, a lighting assembly 215 is further mounted on the underside of one end of the built-in section 21 that is away from the inserting block 22. The lighting assembly 215 includes a light bead 2152 and a button 2151, an internal structure of the lighting assembly 215 being that in the prior art. When the button 2151 is pressed to the extent that the button 2151 is pushed down, the light bead 2152 emits light, and when the button 2151 is pressed again to the extent that the button 2151 rebounds, the light bead 2152 stops emitting light. A rectangular exposed opening 122 is further provided on a surface of the inner support bar 12. The exposed opening 122 is aligned with the lighting assembly 215, such that the light emitted by the light bead 2152 can radiate beyond the inner support bar 12 and the lighting assembly 215 is easily mounted on the built-in section 12.

Figure 8:
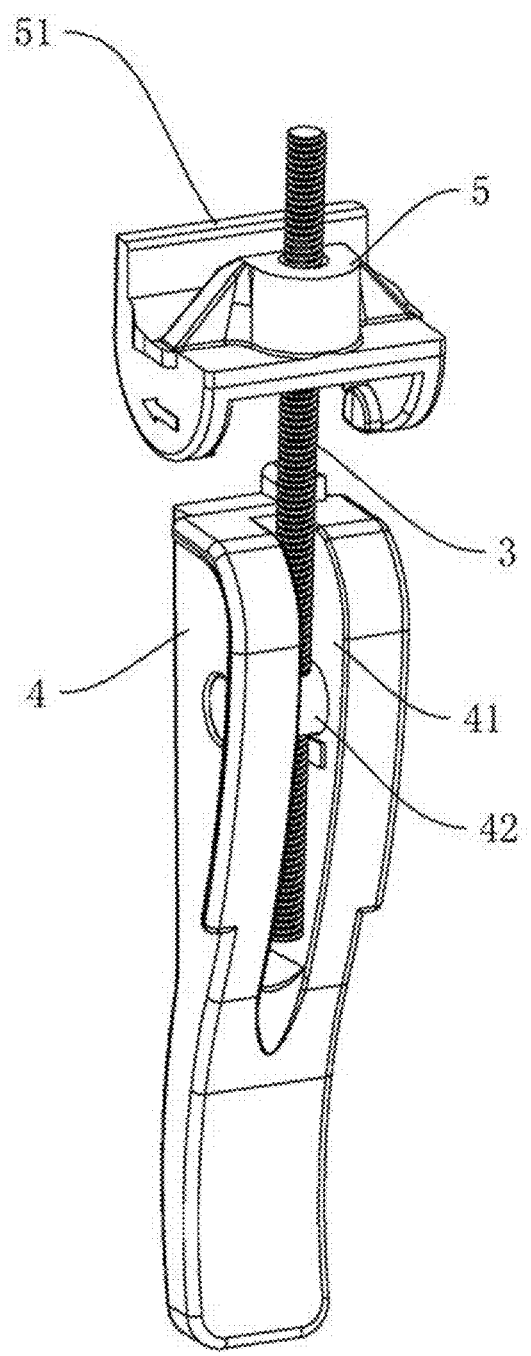
FIG. 8 is a schematic structural diagram of a hanging rod, a handle and a locking block.

As shown in FIG. 8, the hanging rod 3, the locking block 5 and the handle 4 are those in the prior art, only a brief description of their structures being given herein. The hanging rod 3 is a threaded rod, an external thread being provided on a side thereof. An upper end of the hanging rod 3 passes through the through opening 2112 and the through hole 2123 and is connected to the fixing nut 213 through the thread.

A notch 41 parallel to the direction of the length of the handle 4 is provided on the handle, a horizontal shaft 42 being provided inside the notch 41. Both ends of the horizontal shaft 42 pass through the handle 4, and the horizontal shaft 42 may be rotated about an axis thereof. A threaded hole whose axis is perpendicular to the axis of the horizontal shaft 42 is made on a side of the horizontal shaft 42; a lower end of the hanging rod 3 is inserted into the notch 41 and is connected to the threaded hole through the thread. The locking block 5 is sheathed on the hanging rod 3 and is located between the handle 4 and the inner support bar. An abutting and pressing edge 51 is further provided on an edge of an upper surface of the locking block. An upper end of the handle 4 is arc-shaped, and the locking block 5 may be abutted and pressed upward as the handle 4 is rotated.

Figure 9:
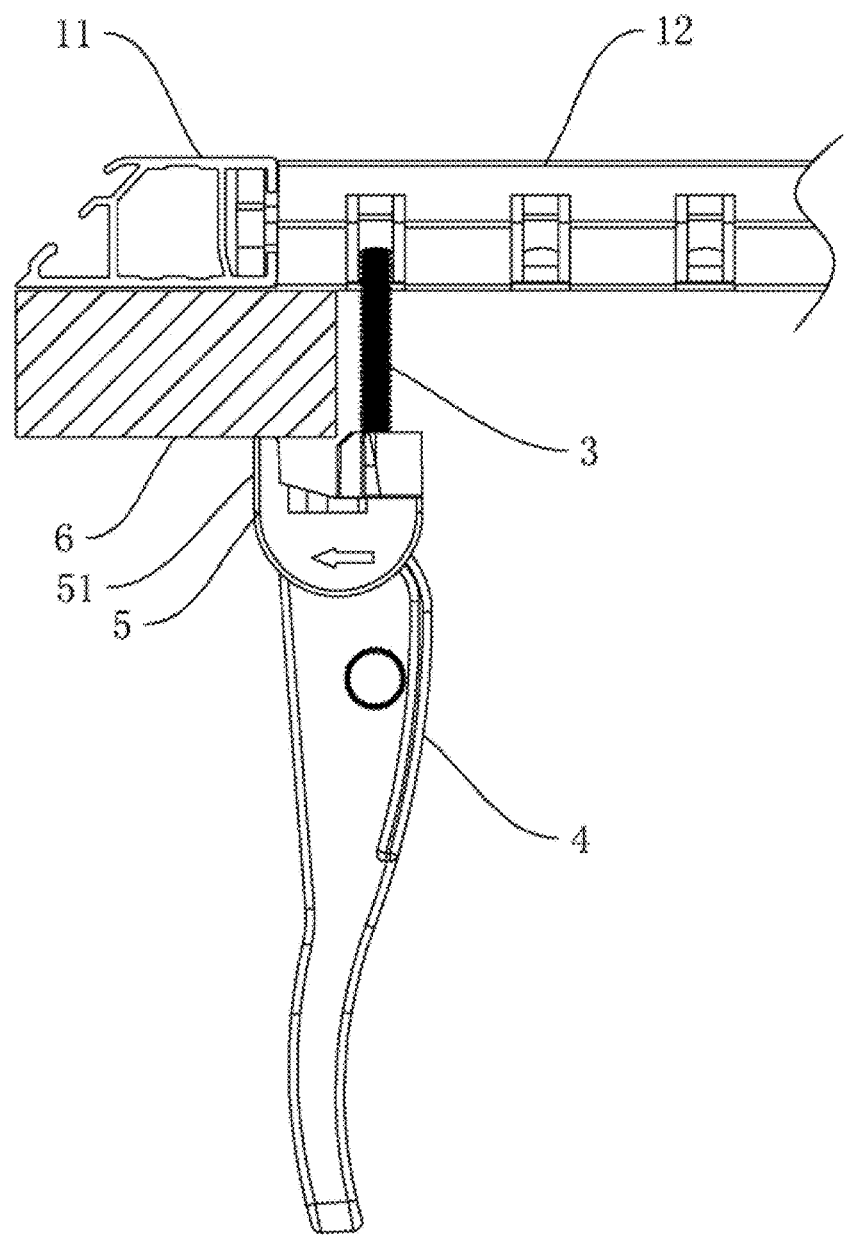
FIG. 9 is a schematic structural diagram when a locking mechanism is locked.

As shown in FIG. 9, when the outer frame bar 11 is pressed against an edge 6 of the cargo area, the handle 4 and the locking block 5 moves to a lower part of the edge 6 of the cargo area. The handle 4 is then rotated to cause the handle 4 abut and press against the locking block 5 and cause the locking block 5 to abut and press against the cargo area cover, thus accomplishing locking and fixing the cargo area cover and the cargo area.

Working principles of this embodiment in the present disclosure may be described as below. The mounting bar 2 is accommodated within the outer frame bar 11 and the inner support bar 12 and is wrapped and protected by the outer frame bar 11 and the inner support bar 12, which prevents the mounting bar 2 from a direct shock resulting from an external force. On the other hand, when the cargo area cover is perpendicularly pressed at the position of the mounting bar 2, the built-in section 21 is protected by the inner support bar 12, thus avoiding a situation in the prior art where a shear stress concentration point exists at a joint between a portion of the inserting bar 2 that is inserted into the inner support bar 12 and a portion that is not inserted into the inner support bar 12. At the same time, the only shear stress concentrate point on the mounting bar 2 is located at a point of abutment between the built-in section 21 and the sliding chute 111, and such point of abutment is a fulcrum for a pressure applied to the cargo area cover to lever the inserting block 22. The length of an arm of force from the inserting block 22 to the fulcrum is close to that in the prior art, while the length of an arm of force from a side of the built-in section 21 to the fulcrum is a distance from the fulcrum to a nearby end of the inner support bar 12. In the present locking mechanism, the built-in section 21 is completely accommodated within the inner support bar 12, so the length of the arm of force from the side of the built-in section 21 to the fulcrum is far less than a distance in the prior art from the joint between the portion of the inserting bar 2 that is inserted into the inner support bar 12 and the portion that is not inserted into the inner support bar 12 to the fulcrum. Consequently, in the present locking mechanism, when the cargo area cover is subjected to the same pressure, a shear stress that the mounting bar 2 is subjected to at the fulcrum and an abutment pressure resulting from the inserting block 22 abutting against an inner side of the sliding chute 111 are far less than those in the prior art. Thus, the mounting bar 2 is not easily broken, and the inserting block 22 and the sliding chute 111 are not easily deformed, thereby reducing the possibility of damaging the mounting bar 2.

In this embodiment, the mounting bar is accommodated within the outer frame bar and the inner support bar and is wrapped and protected by the outer frame bar and the inner support bar, which prevents the mounting bar from a direct shock resulting from an external force.

In this embodiment, when the cargo area cover is perpendicularly pressed at the position of the mounting bar, the built-in section is protected by the inner support bar, thus avoiding a situation in the prior art where a shear stress concentration point exists at a joint between a portion of the inserting bar that is inserted into the inner support bar and a portion that is not inserted into the inner support bar. At the same time, the only shear stress concentrate point on the mounting bar is located at a point of abutment between the built-in section and the sliding chute, and such point of abutment is a fulcrum for a pressure applied to the cargo area cover to lever the inserting block. The length of an arm of force from the inserting block to the fulcrum is close to that in the prior art, while the length of an arm of force from a side of the built-in section to the fulcrum is a distance from the fulcrum to a nearby end of the inner support bar. In the present locking mechanism, the built-in section is completely accommodated within the inner support bar, so the length of the arm of force from the side of the built-in section to the fulcrum is far less than a distance in the prior art from the joint between the portion of the inserting bar that is inserted into the inner support bar and the portion that is not inserted into the inner support bar to the fulcrum. Consequently, in the present locking mechanism, when the cargo area cover is subjected to the same pressure, a shear stress that the mounting bar is subjected to at the fulcrum and an abutment pressure resulting from the inserting block abutting against an inner side of the sliding chute are far less than those in the prior art. Thus, the mounting bar is not easily broken, and the inserting block and the sliding chute are not easily deformed, thereby reducing the possibility of damaging the mounting bar.

Preferably, a plurality of accommodation grooves distributed in the direction of the length of the inner support bar are provided on the built-in section; a rotating column axially parallel to the inner support bar is accommodated within each accommodation groove, both ends of the rotating column being abutted against a wall of the accommodation groove; through openings for passing through the hanging rod is made at the bottom of the accommodation groove; several openings that are in one-to-one correspondence to the through openings and cause the through openings to be exposed are provided on the inner support bar; and an upper end of the hanging rod is capable of being fixed to any rotating column through each through opening.

In the present disclosure, compared to the sliding chute cavity and the sliding rod in the prior art, the plurality of accommodation grooves and the rotating column therein are configured with fixed gears in place of sliding so as to adjust a distance from the hanging rod and the handle to the edge of the cargo area, such that the hanging rod does not slide randomly, thus avoiding and reducing noise caused by waggling of the handle when not in use and avoiding wearing of components resulting from adjustments made in a manner of sliding.

Preferably, a clamping opening in communication with the through opening is provided on a wall of the accommodation groove that is parallel to the direction of the length of the inner support bar, a side of the hanging rod being capable of being clamped and fixed within the clamping opening.

In the present disclosure, when the locking mechanism is not in use, the hanging rod may be driven to rotate by holding the handle, such that the hanging rod is clamped and fixed within the clamping opening, thus preventing the handle from waggling.

Preferably, the opening is aligned with the through opening and the clamping opening at the same time, an edge of the opening being located outside the through opening and the clamping opening.

In the present disclosure, surface losses of the hanging rod and the inner support bar are avoided, such as falling off of paint caused by the hanging rod scratching an edge of the opening when moving within the through opening and the clamping opening.

Preferably, a lighting assembly is provided on a side of the inner support bar that is close to an end of the built-in section that is away from the inserting block.

In the present disclosure, since the handle is located below the cargo area cover when the locking mechanism is locked, in an environment where light is insufficient, the degree of illumination is further reduced due to the blocked light, which frustrates a locking operation of the locking mechanism. At this time, the lighting assembly may be used to provide additional light to ensure that the locking operation of the locking mechanism is accurately performed and make it more convenient to use the locking mechanism.

Preferably, a sliding chute extending in the direction of the length of the outer frame bar is provided on an inner side of the outer frame bar that faces the cargo area cover frame body, the inserting block being inserted into the sliding chute and being capable of sliding within the sliding chute, and a fixing hole perpendicular to the direction of the length of the sliding chute being made on the inserting block.

In the present disclosure, before the mounting bar is fixed, the inserting block may be slid within the sliding chute to adjust a position of the mounting bar, and the mounting bar is then fixed to the outer frame bar by passing a bolt piece through the fixing hole, so as to adapt to rear cargo areas of pickup trucks of different sizes and the corresponding sizes of cargo area covers, and increase the scope of application of the locking mechanism.

Preferably, an embedding groove is made on a side of the rotating column, a through hole for passing through the hanging rod being made at the bottom of the embedding groove, and a fixing nut connected to the upper end of the hanging rod through a thread being embedded at the bottom of the embedding groove.

In the present disclosure, when the locking mechanism is locked, the locking block is upwardly pressed against the edge of the rear cargo area of the pickup truck, subjecting the hanging rod to a downward tensile force. Since the upper end of the hanging rod is not directly connected and fixed to the rotating column, and the rotating column is driven to rotate by means of the abutment between the fixing nut and the embedding groove's wall and bottom, the following situation is avoided: the rotating column is detached and damaged due to an excessively large tensile force applied to the hanging rod in the case that the rotating column is formed by injection moulding on the upper end of the hanging rod or the rotating column is connected to the upper end of the hanging rod through a thread.

Preferably, an upper stop piece shielding the fixing nut is further embedded within a rabbet of the embedding groove.

In the present disclosure, when it is necessary to adjust a maximum vertical distance between the locking block and the mounting bar, the handle needs to be rotated at the position of the hanging rod to drive the horizontal shaft to rise or fall on the hanging rod. Here, the upper stop piece is pressed against the upper end of the hanging rod which is inserted into the accommodation groove, thus preventing the upper end of the hanging rod being screwed into and pressed against an upper stop surface inside the inner support bar and avoiding damaging the inner support bar.

Preferably, a limiting piece that limits a rotation angle of the rotating column is provided on both sides of the accommodation groove that are perpendicular to an axis of the rotating column.

In the present disclosure, the rotation angle of the rotating column is limited, and a limitation for a rotation position of the handle is informed to a user through hand feeling, thus preventing the hanging rod from being excessively rotated to press against and damage the through opening or the clamping opening.

To sum up, the present embodiment has the following beneficial effects:

The mounting bar is accommodated within the outer frame bar and the inner support bar and is wrapped and protected by the outer frame bar and the inner support bar, which prevents the mounting bar from a direct shock resulting from an external force. On the other hand, when the cargo area cover is perpendicularly pressed at the position of the mounting bar, the built-in section is protected by the inner support bar. In addition, the shear stress at the point of abutment between the mounting bar and the rabbet of the sliding chute and the pressure resulting from the inserting block being pressed against the inner side of the sliding chute are both far lower than those in the prior art. Therefore, the mounting bar is not easily broken, and the inserting block and the sliding chute are not easily deformed, which reduces the possibility of damaging the mounting bar.

Figure 10:
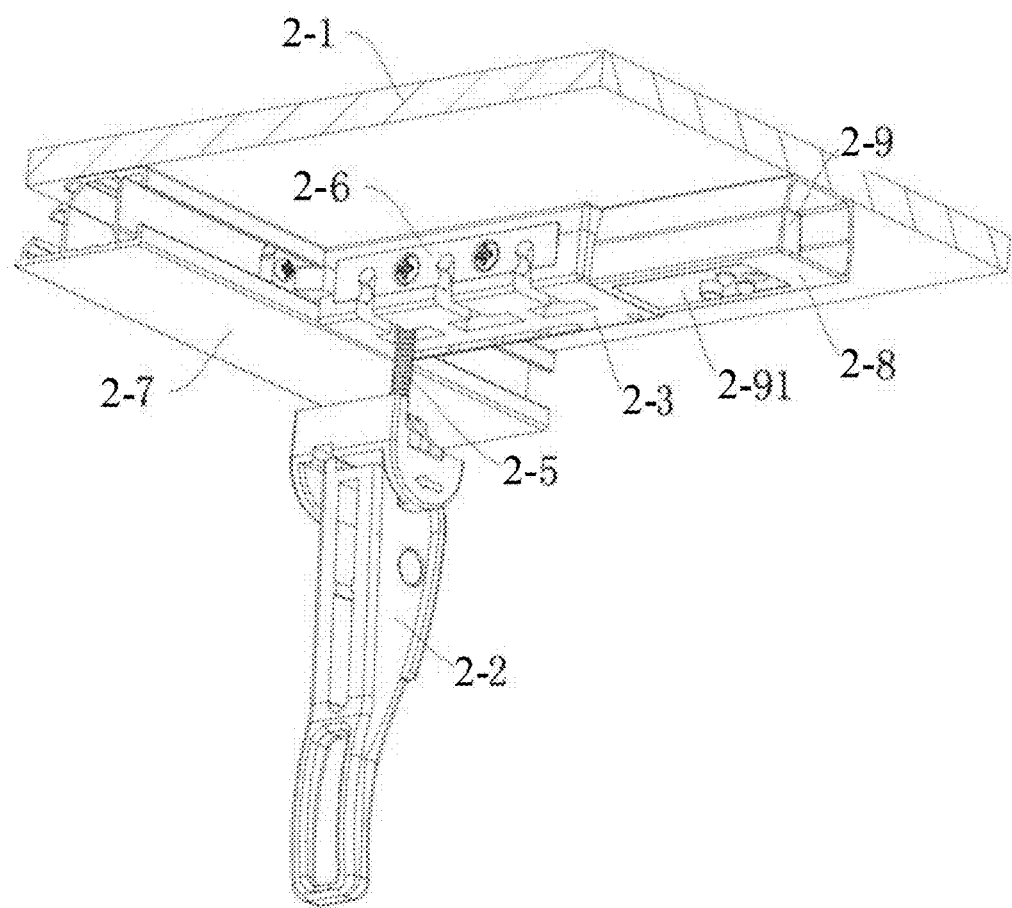
FIG. 10 is a schematic structural diagram of another embodiment mounted on an underside of a cargo area cover.
Figure 11:
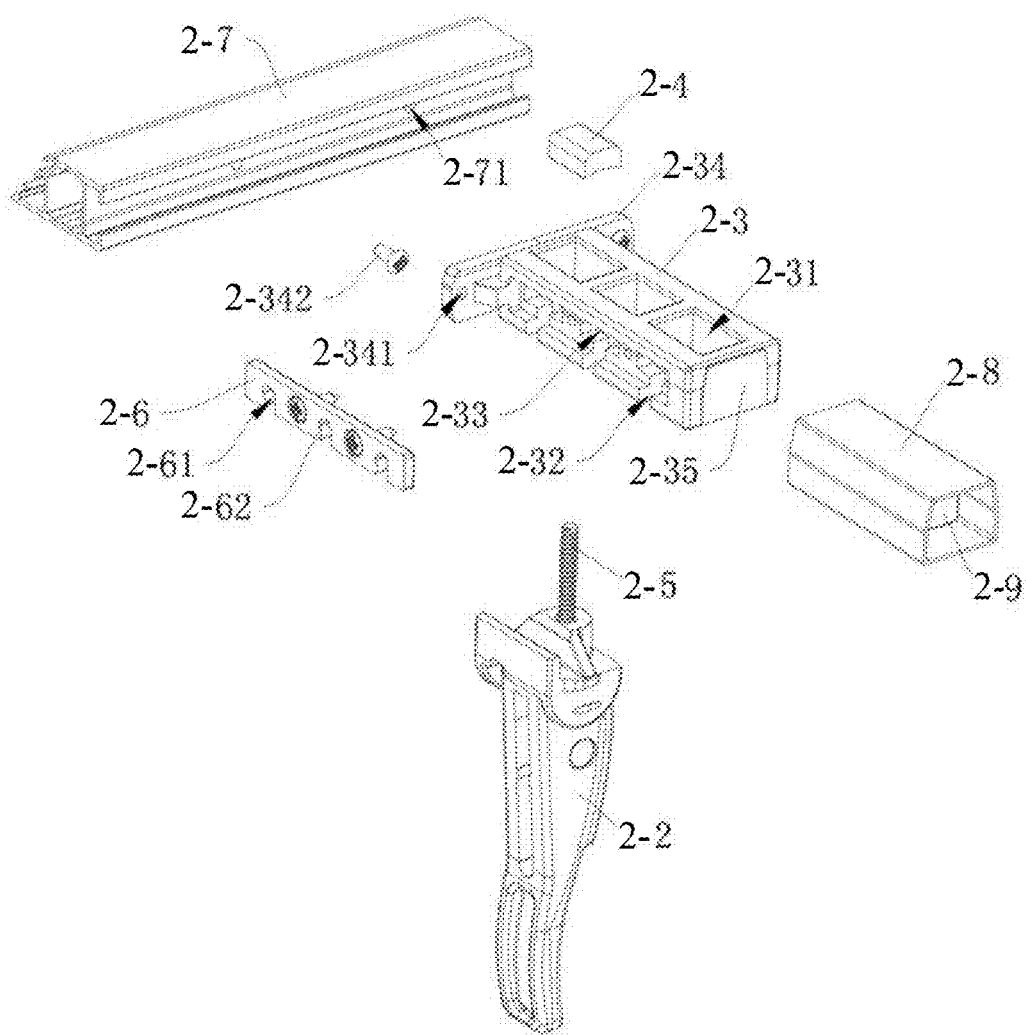
FIG. 11 is an exploded schematic diagram of the embodiment in FIG. 10.
Figure 12:
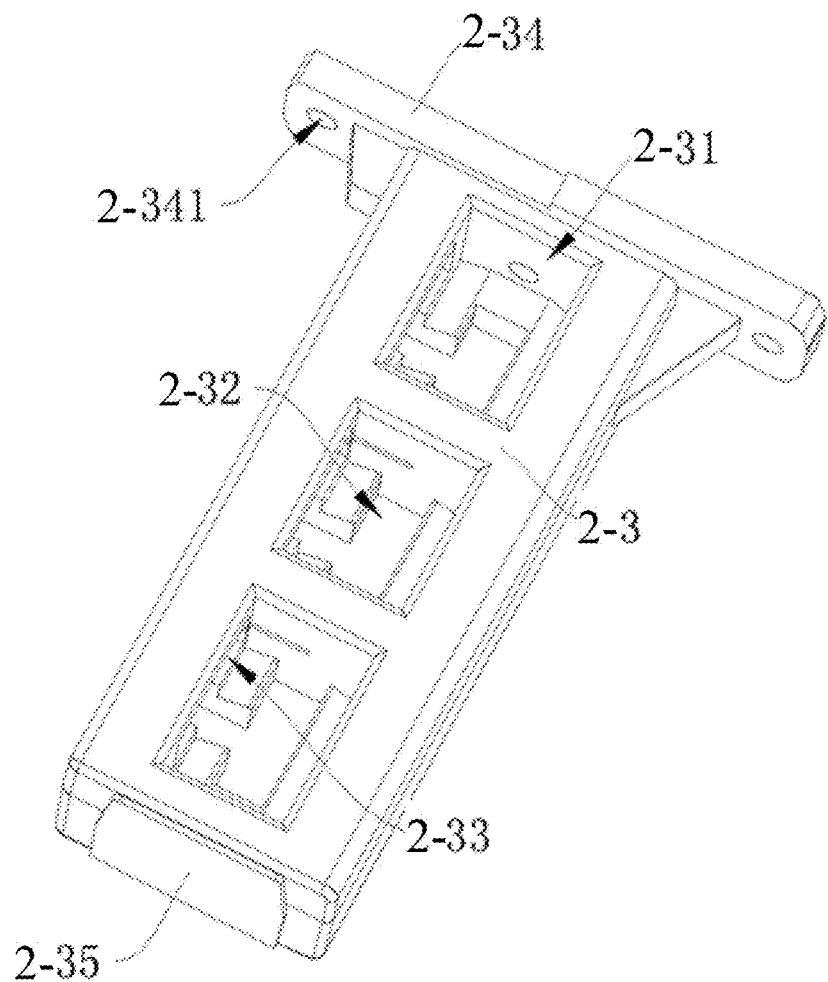
FIG. 12 is a schematic structural diagram of a mounting bar.

Another embodiment of a locking/latching apparatus or a locking/latching system for a cargo area cover for a pickup truck is shown in FIGS. 10-12. In this embodiment, the fast locking/latching apparatus includes a locking handle 2-2, a mounting bar 2-3 mounted on an underside of the cargo area cover 2-1, a positioning block 2-4 fixedly embedded in the mounting bar 2-3, and a connecting rod 2-5 vertically connected the locking handle 2-2 and the positioning block 2-4 through a thread.

The mounting bar 2-3 take the shape of a rectangular bar, three mounting grooves 2-31 for embedding the positioning block 2-4 being provided on the top of the mounting bar 2-3, spaced apart in the direction of the length of the mounting bar. A haft hole 2-32 for passing through the connecting rod 2-5 is provided on the mounting bar 2-3 on the bottom of each mounting groove 2-31. Therefore, the problem that an existing locking mechanism easily slides in the process of locking the cargo area cover 2-1 of the pickup truck is solved, and the locking efficiency of the locking handle 2-2 is improved.

In connection with FIG. 12, in the direction of the width of the mounting bar 2-3, the bottom of the mounting groove 2-31 is higher in the middle and lower on both sides, and an underside of the corresponding positioning block 2-4 is a cambered surface recessed upwardly in the middle. When the cargo area cover 2-1 is locked, the positioning block 2-4 is limited circumferentially, and the mounting bar 2-3 can be stably clamped by the positioning block 2-4 and the locking handle 2-2.

Referring to FIGS. 10 and 11, mounting openings 2-33 in one-to-one correspondence to the mounting grooves 2-31 are made on one side of the mounting bar 3 for transversally sliding in and out the positioning block 2-4. A cover plate 2-6 is further provided for the mounting bar 2-3 on a side of the mounting opening 2-33, the cover plate 2-6 being fixedly embedded in the mounting bar 2-3 through two spaced bolts. In addition, an outer side of the cover plate 2-6 is flush with the side of the mounting bar 2-3, thereby simultaneously covering the three mounting openings 2-33 and fast mounting the positioning block 2-4 in a most suitable mounting groove 2-31.

Three spaced limiting grooves 2-61 in one-to-one communication with the shaft holes 2-32 are made on the bottom of the cover plate 2-6, one limiting block 2-62 bulging on a side wall of each limiting groove 2-61. The connecting rod 2-5 is rotated through the limiting block 62 from bottom to top and is horizontally snapped in the limiting groove 2-61, such that both the locking handle 2-2 and the connecting rod 2-5 converge on the underside of the cargo area cover 2-1 and are parallel to the underside of the cargo area cover 2-1. A side of the limiting block 2-62 that movably abuts against the connecting rod 2-5 is excessively smooth, such that the connecting rod 2-5 can not only be fast slid into the limiting groove 2-61 and fixed therein, but also can be fast slid out of the limiting groove 2-61 upon a certain applied force.

One fixing block 2-34 and an outer frame bar 2-7 that is mounted at an edge of the underside of the cargo area cover 2-1 and is available for snapping and sliding in the fixing block 2-34 are provided on one end of the mounting bar 2-3. The fixing block 2-34 and the mounting bar 2-3 are integrally formed through injection moulding. Several spaced first positioning holes 2-341 are provided in the direction of the width of the mounting bar 2-3. Second positioning holes 2-71 corresponding to the first positioning holes 2-341 are made on the outer frame bar 2-7. One fastener 2-342 is threaded through each first positioning hole 2-341 and at the same time passes through each second positioning hole 2-71. In addition, the fastener 2-342 is a bolt, thus firmly pressing the fixing block 2-34 against the outer frame bar 2-7.

One snapping block 2-35 and an inner frame bar 8 that is mounted on the underside of the cargo area cover 2-1 and is available for inserting the snapping block 2-35 are further provided on one end of the mounting bar 2-3 that is away from the fixing block 2-34. The snapping block 2-35 and the mounting bar 2-3 are integrally formed through injection moulding. The inner frame bar 8 takes the shape of a rectangular frame bar, the direction of the length thereof being perpendicular to the direction of the length of the outer frame bar 2-7, thereby improving the structural stability in the process of mounting the mounting bar 2-3 on the underside of the cargo area cover 2-1.

One lighting assembly 2-9 is internally provided on one side of the inner frame bar 2-8 that is close to the mounting bar 2-3, a control panel 2-91 of the lighting assembly 2-9 being provided on an underside of the inner frame bar 2-8, such that a surrounding area of the locking mechanism is illuminated when it is in a dark environment, thereby accelerating locking of the cargo area cover 2-1 through the locking mechanism.

When the embodiment is in an operation mode, the snapping block 2-35 on the mounting bar 2-3 is first inserted into the inner frame bar 8, and then the fixing block 2-34 is slid into the outer frame bar 2-7. After the mounting bar 2-3 is slid to a set position, a bolt is used to firmly press the fixing block 2-34 against the outer frame bar 2-7. Next, the positioning block 2-4 connected with the locking handle 2-2 is transversally embedded in one of the mounting grooves 2-31 of the mounting bar 2-3, and the mounting openings 2-33 are then covered using the cover plate 2-6, thereby limiting the positioning block 2-4, reducing the possibility that the positioning block 2-4 and the locking handle 2-2 slide, and improving the efficiency of the locking mechanism in locking the cargo area cover 2-1.

The fast locking mechanism for a cargo area cover for a pickup truck described in this embodiment may solve the drawbacks with some previously existing systems, for example, one drawback may be that an existing locking mechanism easily slides in the process of locking the cargo area cover for the pickup truck and improves the locking efficiency of the locking mechanism.

The above technical object of the embodiment may be achieved by the technical solution as described below. A fast locking mechanism for a cargo area cover for a pickup truck, including a locking handle, a mounting bar mounted on an underside of the cargo area cover, a positioning block fixedly embedded in the mounting bar and a connecting rod vertically connected to the locking handle and the positioning block, a plurality of mounting grooves available for embedding the positioning block being made on the top of the mounting bar, spaced apart in the direction of the length of the mounting bar, and a shaft hole available for passing through the connecting rod being made on the mounting bar on the bottom of each mounting groove.

In the present disclosure, the mounting bar is mounted on the underside of the cargo area cover, the positioning block is embedded in the mounting groove, and the connecting rod is connected to the locking handle, thus reducing sliding of the locking handle. At the same time, the plurality of mounting grooves make it easy for the locking mechanism to directly select a suitable position for placing the positioning block according to the type of the pickup truck, and no further adjustment is required in a subsequent locking process, thereby improving the efficiency of the locking handle in locking the cargo area cover for the pickup truck. In addition, it is ensured that the existing locking mechanism can achieve the effect of locking cargo area covers for different types of pickup trucks, thus improving the practical applicability of the locking mechanism.

Further preferably, mounting openings in one-to-one correspondence to the mounting grooves are made on one side of the mounting bar for transversally sliding out the positioning block, and a cover plate for covering the mounting openings are provided on the mounting bar.

In the present disclosure, in adjusting an embedding position of the positioning block, the positioning block is directly mounted and removed through the mounting openings and is then limited by the cover plate, thereby making it unnecessary to remove the mounting bar before adjustment. Therefore, the efficiency of mounting and removing the positioning block is effectively improved.

Further preferably, a limiting groove in communication with the shaft hole is made on the bottom of the cover plate, a limiting block being provided on a wall of the limiting groove, and the connecting rod being rotated through the limiting block from bottom to top and being horizontally snapped in the limiting groove.

In the present disclosure, when the locking handle is not in use, the locking handle is rotated from bottom to top, such that the connecting rod is rotated, thereby rotating and embedding the connecting rod into the limiting groove. The limiting block then limits the connecting rod, such that the locking handle and the connecting rod are in a horizontal state and converge on the underside of the cargo area cover, thus increasing the structural stability of the locking handle.

Further preferably, one side of the limiting block that abuts against the connecting rod is excessively smooth.

In the present disclosure, excessive smoothness of the limiting block makes it easy to slide the connecting rod through the limiting block and limit it in the limiting groove, thus reducing the phenomenon that stress concentrates on the limiting block and reducing wearing of the limiting block.

Further preferably, a fixing block and an outer frame bar mounted at an edge of the underside of the cargo area cover and available for snapping and sliding in the fixing block are provided on one end of the mounting bar.

In the present disclosure, the fixing block is snapped and slid into the outer frame bar, thus making it easy to fast mount the mounting bar on the underside of the cargo area cover. The manner of snapping and sliding in the mounting bar further enables proper adjustments to the position of the mounting bar on the underside of the cargo area cover, thus locking the cargo area cover more satisfactorily.

Further preferably, several first positioning holes are provided on the fixing block, second positioning holes corresponding to the first positioning holes are made on the outer frame bar, a fastener being threaded through each first positioning hole and at the same time passing through each second positioning hole.

In the present disclosure, the fastener is threaded through the first positioning hole and the second positioning hole, and the fixing block is firmly pressed against the outer frame bar, thus increasing the structural stability between the fixing block and the outer frame bar and enabling stable mounting of the mounting bar on the underside of the cargo area cover.

Further preferably, a snapping block and an inner frame bar that is mounted on the underside of the cargo area cover and available for inserting the snapping block are provided on one end of the mounting bar that is away from the fixing block, the outer frame bar being perpendicular to the outer frame bar.

In the present disclosure, the snapping block is inserted into the inner frame bar, the inner frame bar is perpendicular to the outer frame bar, and after one side of the mounting bar is fixed, the other side thereof is similarly fixed, thereby limiting one side of the mounting bar that is away from the fixing block, thus increasing the structural stability in the process of mounting the mounting bar on the underside of the cargo area cover.

Further preferably, a lighting assembly is provided on one side of the inner frame bar that is close to the mounting bar.

In the present disclosure, the lighting assembly can illuminate a surrounding area of the locking mechanism, and the cargo cover area can be fast locked even when it is in a dark environment, thereby improving the locking efficiency of the locking mechanism.

To sum up, this embodiment may have the following beneficial effects:

1. In this embodiment, the positioning block and the plurality of mounting grooves are provided to reduce sliding of the locking handle and increase the efficiency of the locking handle in locking the cargo area cover for the pickup truck. At the same time, the effect of existing locking mechanisms in locking cargo area covers for different types of pickup trucks is ensured, thus achieving satisfactory practical applicability.

2. In this embodiment, the mounting openings and the cover plate are provided to enable fast mounting of the fixing block and increase the efficiency of changing its position. In addition, the lighting assembly can illuminate the surrounding area of the locking mechanism, thus improving its locking efficiency in a dark environment.

3. In this embodiment, the limiting groove and the limiting block fix the locking mechanism when not in use, thereby increasing the structural stability of the locking handle. On the other hand, the fixing block, the outer frame bar, the snapping block and the inner frame bar are configured to limit both ends of the mounting bar, thus increasing the structural stability of the mounting bar and achieving a satisfactory locking effect of the locking mechanism.

The present disclosure describes a locking/latching system for a cargo area cover for a truck with using any of the embodiments as described above.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

The invention claimed is:

1. A apparatus for latching a cargo area cover to a vehicle, the apparatus comprising a mounting bar, a hanging rod, a locking block and a handle, wherein:
   the apparatus further comprises a cargo area cover frame body, the cargo area cover frame body comprising an outer frame bar along an outer edge and an inner support bar inside the cargo area cover frame body, the inner support bar being perpendicular to the outer frame bar;
   the mounting bar comprises a built-in section and an inserting block, the built-in section being located within the inner support bar, and the inserting block being fixed within the outer frame bar;
   an upper end of the hanging rod is inserted into the mounting bar through the inner support bar;
   a horizontal shaft is disposed at an upper portion of the handle, a lower end of the hanging rod being inserted into the horizontal shaft and being connected to the horizontal shaft through a thread; and
   the locking block is sheathed on the hanging rod and being located between the handle and the mounting bar.

2. The apparatus according to claim 1, wherein:
   a plurality of accommodation grooves distributed in a direction of a length of the inner support bar are disposed on the built-in section;
   a rotating column axially parallel to the inner support bar is accommodated within each accommodation groove, both ends of the rotating column being abutted against a wall of the accommodation groove;
   through openings for passing through the hanging rod is made at a bottom of the accommodation groove;
   several openings that are in one-to-one correspondence to the through openings and cause the through openings to be exposed are disposed on the inner support bar; and
   an upper end of the hanging rod is capable of being fixed to any rotating column through each through opening.

3. The apparatus according to claim 2, wherein a clamping opening in communication with the through opening is disposed on a wall of the accommodation groove that is parallel to the direction of the length of the inner support bar, a side of the hanging rod being capable of being clamped and fixed within the clamping opening.

4. The apparatus according to claim 3, wherein the opening is aligned with the through opening and the clamping opening at the same time, an edge of the opening being located outside the through opening and the clamping opening.

5. The apparatus according to claim 3, wherein an embedding groove is made on a side of the rotating column, a through hole for passing through the hanging rod being made at the bottom of the embedding groove, and a fixing nut connected to the upper end of the hanging rod through a thread being embedded at the bottom of the embedding groove.

6. The apparatus according to claim 5, wherein an upper stop piece shielding the fixing nut is further embedded within a rabbet of the embedding groove.

7. The apparatus according to claim 5, wherein a limiting piece that limits a rotation angle of the rotating column is disposed on both sides of the accommodation groove that are perpendicular to an axis of the rotating column.

8. The apparatus according to claim 1, wherein a lighting assembly is disposed on a side of the inner support bar that is close to an end of the built-in section that is away from the inserting block.

9. The apparatus according to claim 1, wherein:
   a sliding chute extending in a direction of a length of the outer frame bar is disposed on an inner side of the outer frame bar that faces the cargo area cover frame body, the inserting block being inserted into the sliding chute and being capable of sliding within the sliding chute, and a fixing hole perpendicular to the direction of the length of the sliding chute being made on the inserting block.

10. A system for latching a cargo area cover to a vehicle, the system comprising an apparatus, wherein:
   an apparatus comprises a mounting bar, a hanging rod, a locking block and a handle, wherein:
      the apparatus further comprises a cargo area cover frame body, the cargo area cover frame body comprising an outer frame bar along an outer edge and an inner support bar inside the cargo area cover frame body, the inner support bar being perpendicular to the outer frame bar;

the mounting bar comprises a built-in section and an inserting block, the built-in section being located within the inner support bar, and the inserting block being fixed within the outer frame bar;

an upper end of the hanging rod is inserted into the mounting bar through the inner support bar;

a horizontal shaft is disposed at an upper portion of the handle, a lower end of the hanging rod being inserted into the horizontal shaft and being connected to the horizontal shaft through a thread; and the locking block is sheathed on the hanging rod and being located between the handle and the mounting bar.

11. The system according to claim 10, wherein:

a plurality of accommodation grooves distributed in a direction of a length of the inner support bar are disposed on the built-in section;

a rotating column axially parallel to the inner support bar is accommodated within each accommodation groove, both ends of the rotating column being abutted against a wall of the accommodation groove;

through openings for passing through the hanging rod is made at a bottom of the accommodation groove;

several openings that are in one-to-one correspondence to the through openings and cause the through openings to be exposed are disposed on the inner support bar; and an upper end of the hanging rod is capable of being fixed to any rotating column through each through opening.

12. The system according to claim 10, wherein:

a sliding chute extending in a direction of a length of the outer frame bar is disposed on an inner side of the outer frame bar that faces the cargo area cover frame body, the inserting block being inserted into the sliding chute and being capable of sliding within the sliding chute, and a fixing hole perpendicular to the direction of the length of the sliding chute being made on the inserting block.

* * * * *